Nov. 17, 1964  J. R. CONREY  3,157,374
AIRPORT DESIGN
Filed Jan. 18, 1963  2 Sheets-Sheet 1

INVENTOR
JAMES R. CONREY

BY Claude Funkhouser
ATTORNEY

Nov. 17, 1964          J. R. CONREY          3,157,374
                        AIRPORT DESIGN
Filed Jan. 18, 1963                    2 Sheets-Sheet 2

United States Patent Office 3,157,374
Patented Nov. 17, 1964

3,157,374
AIRPORT DESIGN
James R. Conrey, 409 N. Mangoustine Drive,
Sanford, Fla.
Filed Jan. 18, 1963, Ser. No. 252,536
1 Claim. (Cl. 244—114)
(Granted under Title 35, U.S. Code (1952), sec. 266)

The invention described herein may be manufactured and used by or for the Government of the United States of America for governmental purposes without the payment of any royalties thereon or therefor.

This invention relates to landing facilities in general and to a new concept in the design of airport facilities in particular.

The general trend in aircraft development towards higher gross weights and increased speed has brought necessary growth in airports that is rapidly becoming untenable in many respects. This heavier weight and increased speed requires considerably more space than is now found in most local metropolitan airports. In the typical metropolitan areas, additional space is not available for airport expansion or relocation. In addition, larger, heavier and faster aircraft also create the problem of longer taxiing periods to reach the portion of the runway from which the takeoff will begin or where a landing can terminate safely. In today's jet age where engines consume substantially greater quantities of fuel per operating hour than with propeller type aircraft and such planes cost considerably more to purchase and operate, such time loss in taxiing and other time loss on the ground is extremely expensive both from the point of view of fuel consumption and that of equipment tie-up. In order to have economical operation of aircraft, delay time must be maintained at a minimum and a maximum utilization of time be directed to in-flight operation. The time lost in taxiing to or from take-off or landing spots or waiting for other aircraft to taxi to or from landing and take-off positions is expensive and such losses can ill be afforded by the commercial air lines. In military operations, the tie-up of aircraft on the ground can result in loss of lives.

As a safety feature the length of runways is also critical. It is always dangerous, if not impossible, to abort a take-off where necessary when limitations exist as to the length of the runway. Furthermore, single engine jet aircraft when attempting an approach after flameout present pilot hazards which almost invariably require pilot ejection in view of an unsatisfactory runway length.

Finally, the numerous runways required to provide for all wind conditions are extremely expensive to build, require additional unobtainable space and provide confusing traffic patterns around the air facility.

This invention overcomes many of the above mentioned problems existing in this area. A circular runway having an infinite length reduces the amount of space required for the airport facility and provides the required safety features now sought. The specific advantages of a circular design are many. A runway which is of unlimited length will accommodate aircraft experiencing emergencies with the critical time factor necessary on take-off so that they may abort or if airborne re-land safely. Also an unlimited runway length allows safe flame-out or no power approaches. A banked feature of the runway provides positive stability during roll which is automatically generated by lateral vector forces which keep the aircraft on the runway. In addition, the aircraft are always provided with into-the-wind take-off and landing facilities, since the take-off or landing can take place along any part of a 360° circle. Also, the single runway provides single dimension instrument approaches which is an important feature in allowing a pilot to align the aircraft with a runway that is suitable for landing. The infinite runway provides for instrument approaches which do not proceed over residential areas. Take-offs and landings do not endanger citizenry. Such an airport arrangement employs only about two-thirds of the total area of comparable conventional systems and no more runway length than the average international airport. The circular arrangement provides compactness which increases all around efficiency. It reduces taxi distances which converts time to money for the users. It also provides built-in growth potential for future high speed aircraft which it may not be possible to provide for in area limited conventional runway systems, and obtains some noise abatement advantages which will result naturally from the runway's lateral geometry. Finally, fragmentation by military action would require a plurality of well placed craters before the aircraft effectiveness would become seriously hampered. Complete immobilization would be highly unlikely.

One object of the present invention resides in the provision of a substantially improved circular landing facility.

Another object is to provide a substantially improved circular runway which reduces the amount of space required for the airport.

A further object of the invention is the provision of an airport design that provides important new safety features, such as an infinite runway length to accommodate aircraft experiencing emergencies on take-off so that they may abort or re-land safely.

Still another object is to provide facilities for aircraft into-the-wind take-offs regardless of wind direction conditions.

Another object of this invention is the provision of an airport which has growth potential for higher speed aircraft, this growth potential being a built-in feature of the airport design.

A still further object is the provision for instrument approaches which do not proceed over residential areas, take-off and landings which do not endanger citizenry and which allow for single dimension instrument approaches.

Other objects and many of the attendant advantages of this invention will become apparent from the following detailed description of the invention when considered in conjunction with the accompanying drawings wherein.

Figure 4:
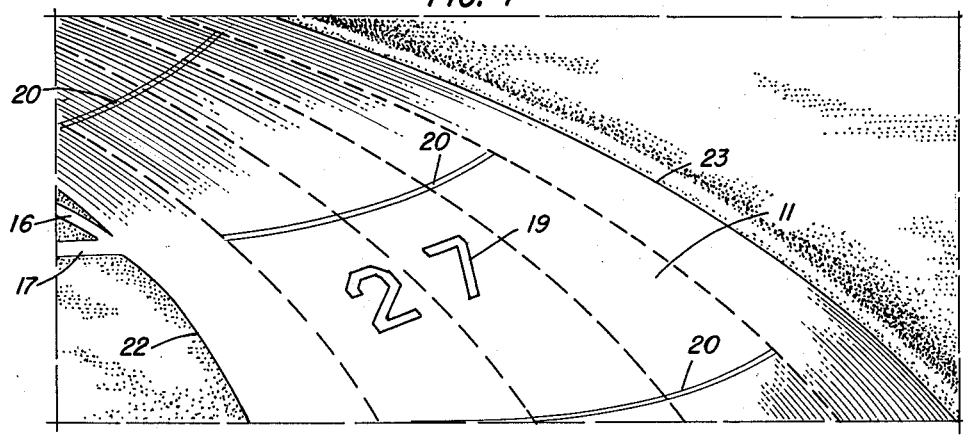

FIG. 4 is a perspective view of a section of the runway showing heading markings which are marked along the runway at 30 degrees increments beginning with magnetic north. Radial striped lines 20 are also shown. These lines preferably are positioned at thousand feet intervals along the circumference of the runway to act as distance marks along the runway.

Figure 5:
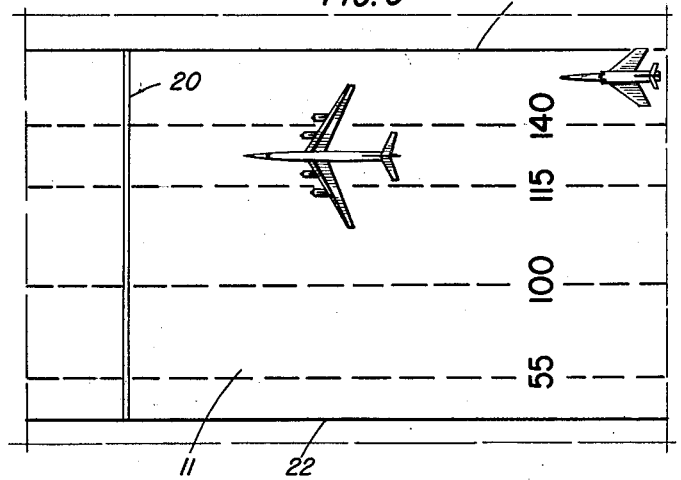

FIG. 5 is an enlarged sectional view of the runway showing the lane guide lines with the respective air speeds thereon.

Figure 1:
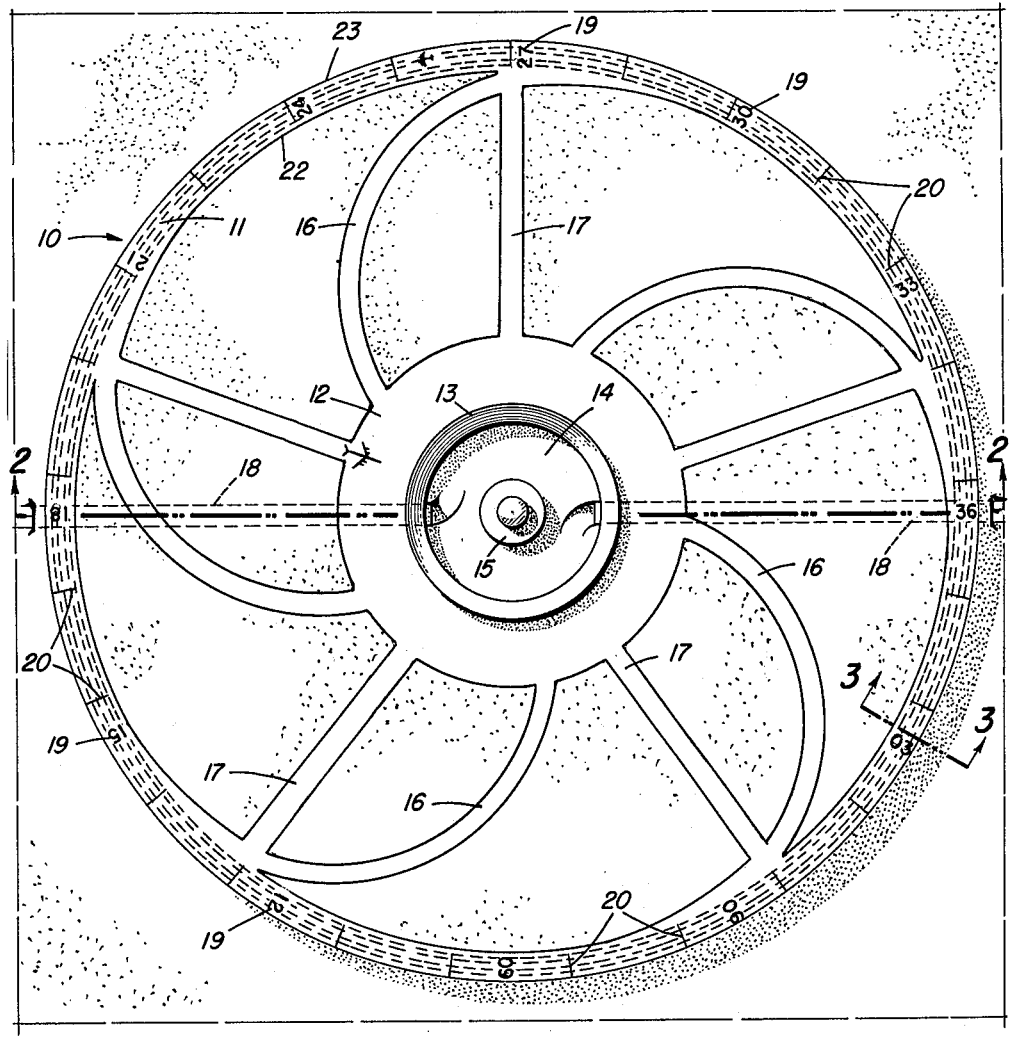
FIG. 1 shows a plan view of the preferred embodiment of the invention.
Figure 2:
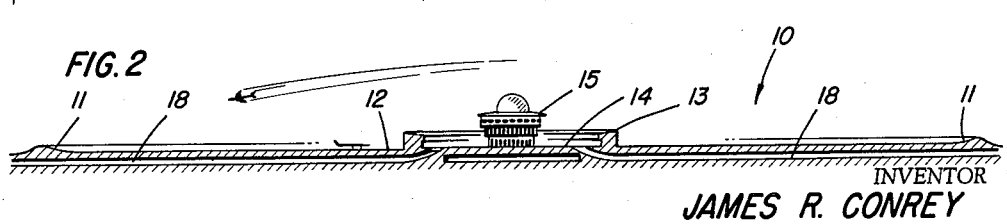
FIG. 2 shows an elevation view of the landing facility taken along the line 2—2 of FIG. 1.

Referring now to drawings wherein like reference characters designate like or corresponding parts throughout the several views there is shown in FIG. 1 a substantially circular landing facility comprising a runway 11, an aircraft parking and loading ramp 12, an airport terminal building 13, a parking and garden area 14, a control tower for housing radar and navigation aids 15. Leading off from the runway are the high speed turn-offs 16 for planes coming into the airport. Taxi-ways 17 are used for planes departing the airport. Roadways 18 pass under the runways and high speed turn-offs to provide access to the airport terminal buildings.

Figure 3:
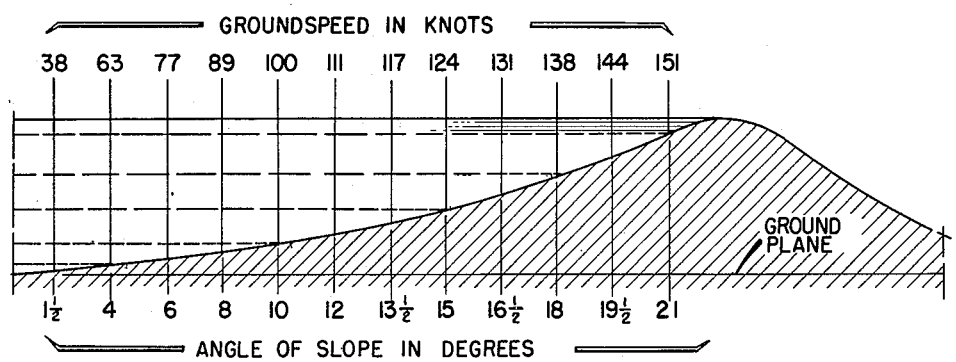
FIG. 3 shows a section of the runway taken along the line 3—3 of FIG. 1, looking in the direction of the arrows.

The runway 11 is sloped or banked as shown in FIG. 3. The slope is determined by specific design requirements and slope of the lateral sections of the runway between the inner edge 22 and the outer edge 23 will vary from the inner edge towards the outer edge. Although actual requirements will determine size and in particular the slope of the runway as a specific example of determining the slope and hence the size of the runway, the following illustration is given: Assume for the purposes of the illustration that aircraft requirements dictate that at 125 knots (143 miles per hour) the aircraft fly at no more than 15 percent bank angle in order to maintain its position over the runway. Accordingly, as the aircraft is about to touch down it should have no more than 15 degrees of bank angle. Consequently, the runway at this point of touch down should have no more than 15 degrees of slope. Using these figures as a design requirement the radius of the illustrative runway can be determined using the well known friction force and centrifugal force formulas since the friction force must balance the centrifugal force tending to move the aircraft off the runway.

$$\left(\text{Tan } \theta = \frac{V^2}{gr}\right)$$

Using these formulas a base radius is determined. Further, the desired bank angles for various speeds are selected and the radii for these speeds and angles determined. If the design of the runway is to satisfy a demand to handle speeds of from 35 knots per hour at the inner periphery to 150 knots on the outer periphery, calculations show that the runway radius will range from 4950 feet at the inner radius to 5250 feet at the outer radius. This provides for a track width of 300 feet. The resulting slope begins with a one and one half degree slope on the inside for 25 feet increasing at the rate of 2 degrees per 25 feet for 125 feet and then increasing at one and one half degrees per 25 feet to the outside. Taken in 25 foot increments from the inside average slope in the order of increasing magnitude is one and one half degrees, 4 degrees, 6 degrees, 8 degrees, 10 degrees, 12 degrees, 13½ degrees, 15 degrees, 16½ degrees, 18 degrees, 19½ degrees, and 21 degrees. The landing ground speeds in knots which are a function of these angles, respectively, are 38, 63, 77, 89, 100, 111, 117, 124, 131, 138, 144 and 151. The circumference of the circle described by the stripe around the middle of the track near the 125 knot circle is approximately 32,000 feet. A whole number in thousandths of feet is used so that radial stripping will come out even.

As shown in FIGS. 4 and 5, the runway is marked with headings measured in 30 degree increments from magnetic north and also with thousand foot radial stripes again starting with magnetic north. Also ground speed lines are marked on the runway as shown in FIG. 5. These ground speed lines are used as guides by the pilot to determine on what lateral portion of the runway the aircraft will set down. It should be noted that aircraft will approach in left hand turns when using the circular runway. Therefore, all identification numerals located on the runway will be positioned so that the pilot can read them as the aircraft approaches in the left hand turn.

High speed turn-offs are provided at approximately every 72 degrees and are banked at one and one half degrees to the left in the left hand motion about the circle and are approximately 80 feet wide. Straight out unbanked taxi ways which will not conflict with high speed turn-offs are provided at alternate 72 degree headings for departing aircraft traffic. The taxi-ways lead to the ramp and air terminal which is a doughnut-shaped building the size of which is predicated on the anticipated space requirements of the field users. This provides a passenger terminal 13, terminal parking, loading maintenance and administration spaces. Surrounding the terminal is a flat doughnut-shaped ramp the span of which is from the terminal buildings to the outer circumference. In the instant example the distance is approximately 500 feet, which provides parking and loading space for the aircraft. It should be understood that the foregoing disclosure relates to a preferred embodiment of the invention and that numerous modifications or alterations may be made therein without departing from the spirit and scope of the invention as set forth in the appended claim.

What is claimed is:

A landing facility having in combination:
 a substantially circular runway,
 said circular runway having an inner and outer edge and a varying average slope of increasing magnitude between the inner and outer edges at a rate of one and one-half degrees per predetermined unit of runway width,
 high speed turn-offs provided at approximately every 72 degrees banked at one and one-half degrees to the left in the direction of the turn per said predetermined unit of width and leading tangentially from the edge of the runway towards the centers of the circular runway whereby aircraft can land at various ground speeds at various radial positions on the runway and exit from the runway at high rates of speed, and
radial taxiways for departing aircraft.

References Cited by the Examiner
UNITED STATES PATENTS 1,526,268  2/25  Dobie _____ 244—114
3,061,245  10/62  Brandt _____ 244—114

OTHER REFERENCES

Flight Magazine, Dec. 20, 1957, pages 963, 964.

MILTON BUCHLER, *Primary Examiner.*

ANDREW H. FARRELL, *Examiner.*